UNITED STATES PATENT OFFICE.

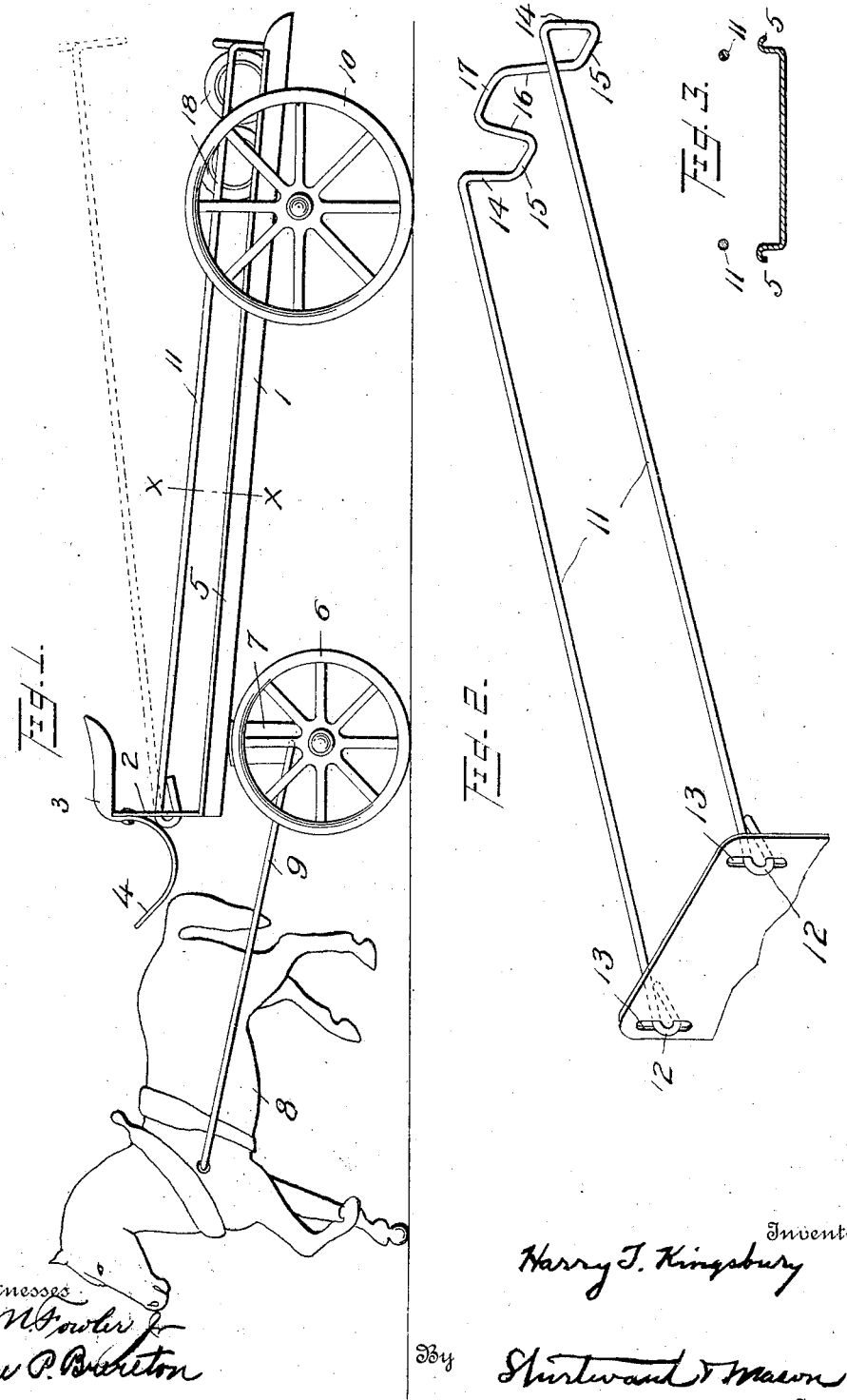

HARRY T. KINGSBURY, OF KEENE, NEW HAMPSHIRE.

TOY TRUCK-CART.

967,785. Specification of Letters Patent. Patented Aug. 16, 1910.

Application filed November 4, 1909. Serial No. 526,283.

*To all whom it may concern:*

Be it known that I, HARRY T. KINGSBURY, a citizen of the United States, residing at Keene, in the county of Cheshire, State of New Hampshire, have invented certain new and useful Improvements in Toy Truck-Carts, of which the following is a description, reference being had to the accompanying drawing, and to the letters and figures of reference marked thereon.

The invention relates to new and useful improvements in toy truck carts, and has for its object to provide a truck cart with a supporting wire, which extends along the sides of the cart, and which is spaced from the bottom thereof so as to aid in supporting articles in the cart.

A further object of the invention, is to provide a truck cart, for supporting toy barrels, which cart is provided with a wire or rail extending along the sides of the cart and spaced from the bottom thereof, the wires or rails at the sides of the cart, being connected at the rear end thereof, and pivotally supported at the forward end thereof.

In the drawings; Figure 1, is a side view of my improved truck cart. Fig. 2 is a detail perspective view showing the supporting wire for my cart. Fig. 3 is a section transversely through the cart.

The bottom portion 1, as herein shown, is provided with a forward end portion 2, which is preferably formed integral with the bottom portion, and a seat 3, having a foot rest 4, is riveted to said forward end portion 2. The sides of the bottom portion 1, are bent upward as at 5, 5. The rear end of the bottom portion is without obstruction.

The forward wheels 6, are pivoted to an axle, carried by a bracket 7, which in turn is pivoted to the bottom portion of the truck. As herein shown a figure 8, *e. g.* a horse, is secured by means of the thills 9 to the bracket 7. The rear wheels 10 are connected to an axle which is secured in any desired way directly to the bottom portion of the cart.

The bracket 7 will cause the forward end of the truck cart to be raised to a point higher than the rear end, and consequently the bottom of the cart will incline downwardly from front to rear.

In order to retain articles, especially toy barrels or the like, on the bottom portion of the truck, I have side wires or rails 11, 11, which are formed into eyes 12, 12, at their forward end. The eyes 12, 12, as herein shown, extend through slots 13, formed in the end portion 2, and surround a cross lug, whereby said side wires or rails, are pivotally connected to said end portion.

The wires 11, 11, at their rear ends, are bent downwardly as at 14, thence laterally as at 15, thence upwardly as at 16, and the upwardly extending portions are connected as at 17. The lateral portions 15, 15, are adapted to rest on the bottom portion, and the downwardly extending portion 14 will thus cause the side wires or rails 11, to be held spaced above the bottom portion of the cart.

The upwardly extending portions 16, 16, and connecting part 17, will serve to obstruct the rear end of the cart, and thus form a support for the articles therein.

If the truck cart is loaded with toy barrels 18, 18, as shown in Fig. 1, the wire extending across the end of the cart, will prevent the barrels from rolling out of the cart. When it is desired to unload the cart the wire frame consisting of the side wires and the connecting bent portions at the rear end of the cart is raised to the dotted line position shown in Fig. 1, and the barrels will roll out of the cart, owing to the downward inclination of the bottom thereof.

Having thus particularly described my invention, what I claim as new and desire to secure by Letters Patent, is:—

1. A toy cart comprising a wheeled bottom portion, and a wire frame pivotally connected at the forward end of the cart, extending along the sides and across the rear end of said cart.

2. A toy cart comprising a bottom portion, wheels for supporting the same, a front end portion connected to said bottom portion, wires connected to said front end portion extending along the sides of the cart, and connected at the rear end of the cart, said connecting portion being bent laterally so as to hold articles in the cart.

3. A toy cart comprising a bottom portion, wheels connected to said bottom portion, so that said bottom portion is inclined rearwardly, and a wire frame pivotally connected at the forward end of the cart, and extending along the sides thereof, and across the rear end of said cart.

4. A toy cart comprising a bottom portion, wheels connected to said bottom portion, so that the same inclines downwardly from front to rear, a front end portion formed integrally with said bottom portion, a seat and foot rest supported by said front end portion, a wire frame pivotally connected to said front end portion, and extending along the sides of the cart and across the rear thereof, the rear end portion of the wire frame being bent so as to support the side portion of the frame above the bottom thereof, and so as to form a central upwardly projecting portion, for holding articles in the cart.

In testimony whereof I affix my signature, in presence of two witnesses.

HARRY T. KINGSBURY.

Witnesses:
W. L. MASON,
C. C. STURTEVANT.